No. 849,485.
PATENTED APR. 9, 1907.
M. METZGER.
HOISTING DEVICE.
APPLICATION FILED APR. 11, 1906.
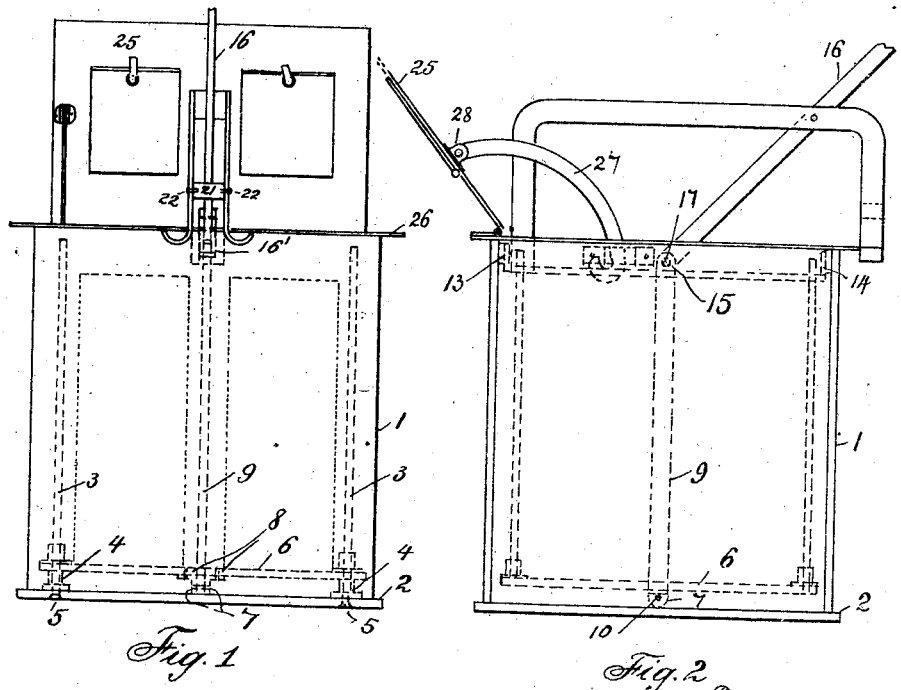
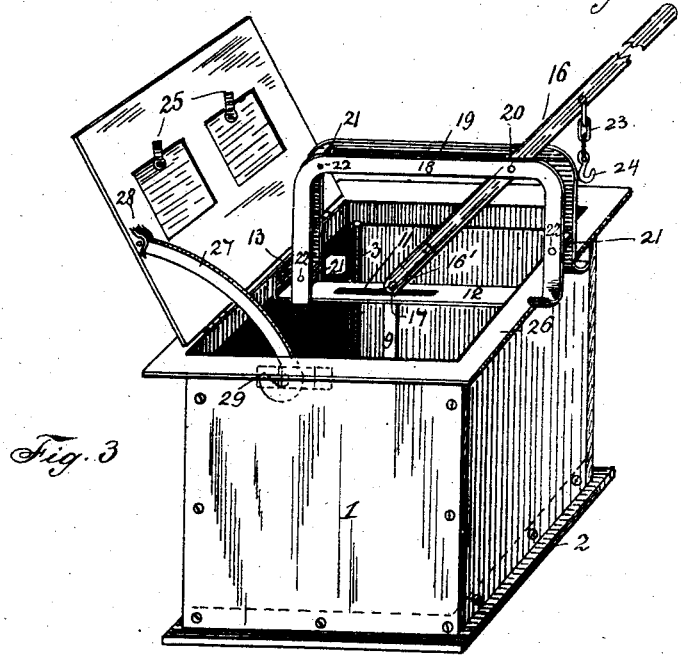
WITNESSES
INVENTOR

UNITED STATES PATENT OFFICE.

MAX METZGER, OF CHICAGO, ILLINOIS.

HOISTING DEVICE.

No. 849,485.  Specification of Letters Patent.  Patented April 9, 1907.

Application filed April 11, 1906. Serial No. 311,025.

*To all whom it may concern:*

Be it known that I, MAX METZGER, a citizen of the United States, residing at Chicago, in the county of Cook and State of Illinois, have invented certain new and useful Improvements in Hoisting Devices, of which the following is a clear and accurate specification.

My invention relates particularly to improvements in hand-hoists used for the purpose of raising a hoisting-platform upon which household refuse, garbage, and the like may be placed by a hand-lever mechanism.

The platform is contained within a box-like elevator-cage located below the surface of the ground or sidewalk. The receptacles into which refuse, ashes, or garbage are deposited are placed upon the platform, and the box may then be covered up by a hinged cover, whereby such refuse and garbage is ordinarily concealed. This object is attained in my invention by the device illustrated in the accompanying drawings, in which—

Figure 1 is a full front elevation showing the hinged cover thrown back and the hoisting-lever placed in position. Fig. 2 is a side elevation, and Fig. 3 is a full perspective view, of the opened cage with the hoisting-lever placed in position and attached to the vertical elevating-strap by which the platform is raised.

Like characters refer to like parts throughout the several views.

A substantial box or cage 1 is built upon a heavy bottom part 2, to which it is fastened in a suitable way. Within the box and located in the four corners thereof are four posts 3, secured in sockets 4 and fastened to the bottom 2 by means of countersunk screws 5. These posts 3 extend upwardly within box 1 nearly to its top and serve as guide-posts to the platform 6. Two angle-brackets 7 are fastened to the under side of slotted platform 6 by bolts 8. Between these brackets upright strap 9 swings freely, being pivoted therein by pin 10, extending upwardly nearly to the top of the box, where it passes through a slot 11 in cross-strap 12, which guides it as to side movement. Cross-strap 12 is bent upwardly at right angles at both ends, forming ears 13 and 14, whereby it is secured to the sides of box 1.

Vertical strap 9 is provided at its uppermost end with eye 15, a forked lever 16 slips over it, and connection therewith is established by pin 17, which passes through holes in the fork 16' of lever 16 and through the said eye 15. Lever 16 extends diagonally upward and swings in a horizontal brace consisting of two members 18 and 19 around pin 20.

Members 18 and 19 are connected together by space-blocks 21, which are placed between the said members and fastened thereto by screws 22. The downwardly-disposed legs of members 18 and 19 grip cross-strap 12 between them within the box 1, resting thereon with their space-block 21, as shown in Fig. 3. Outwardly of the box they may be bent sidewise at right angles or in a curvature, as shown, merely so as to provide a surface whereby they may rest upon the ground.

The part of lever 16 extending diagonally above the horizontal brace 18 and 19 may be as long as desirable for the convenient raising of the weight placed upon platform 6. By forcing that end of the said lever 16 down it will be seen that the other end of it must swing upward, and as it is jointed to upright strap 9 the latter will be pulled along with it, carrying the platform 6 to the surface. Slot 11 provides the required space for the movement of strap 9, which movement is occasioned owing to the fact that lever 16 swings around pin 20. The raised platform is then secured in that position by fastening chain 23 and hook 24 to any stationary object in the ground or sidewalk in such a way that lever 16 is held down.

As soon as the refuse-receptacles have been emptied they may be placed back upon the platform 6. Lever 16 is then unfastened and the said platform is lowered down to the bottom of cage 1. The fork 16' of lever 16 is then disconnected from upright strap 9 and the brace 18 19, with lever 16, is removed. A large cover 25 is hinged to the top frame 26 of the box. When opened, it is held in the position as shown by curved strap 27, which swings between lugs 28, secured to the cover. Its other end is bent and shaped into a hook which grips side bracket 29, fastened to box 1, whereby the opened cover is held in a position slightly leaning backward.

Cover 25 is provided with two or more small covers 29. The refuse is ordinarily deposited through these small covers, which eliminates the necessity of opening the large cover 25 for that purpose.

The forked end 16' of lever 16 must be made sufficiently long so that the platform 6 may be raised fully to the upper line of box 1.

It will be seen that the depth of the cages may vary without causing inconvenience, so long as the forked end 16' of lever 16 is longer than the depth of the deepest box in which the elevator-platform is to be operated by the said lever.

The raising-lever is in the possession of the garbage man and is to be used for all of the garbage-elevators placed within his territory.

It will be appreciated that it is possible to make such changes in the practical construction of the device as may appear desirable without departing from the scope of my invention.

Having thus fully described my invention, what I claim as new, and desire to secure by Letters Patent, is—

1. In an elevator-cage, placed below the surface of the ground or sidewalk, the combination, with a platform therein, an elevating-strap connected movably to said platform and extending upwardly within said cage, a slotted cross-strap 12 within which said elevating-strap is guided, a raising-lever, a horizontal brace within which the said raising-lever swings around an axle fastened thereto, means to connect said raising-lever to the said elevating-strap whereby a flexible connection between the two is formed and means to support the said raising-lever bove the said cage, so that the elevator-platform may be raised to the surface by operating said raising-lever, substantially as described.

2. In an elevator-cage placed below the surface of the ground or sidewalk, the combination, with a platform therein, a raising-lever placed above the cage and swingingly supported within a portable brace, an elevating-strap fastened swingingly to the said platform, a flexible connection establishing connection between the said raising-lever and the said elevating-strap at will, a portable brace upon which said raising-lever swings and means by which said portable brace may be supported above the cage, for the purpose and substantially as described.

In testimony whereof I have signed my name to this specification in the presence of two subscribing witnesses.

MAX METZGER.

Witnesses:
J. C. GOOSMANN,
HENRY SIMSON.